United States Patent
Popescu-Stanesti et al.

(10) Patent No.: US 6,888,338 B1
(45) Date of Patent: May 3, 2005

(54) PORTABLE COMPUTER AND DOCKING STATION HAVING CHARGING CIRCUITS WITH REMOTE POWER SENSING CAPABILITIES

(75) Inventors: Vlad Popescu-Stanesti, San Jose, CA (US); Constantin Bucur, Santa Clara, CA (US)

(73) Assignee: O2Micro International Limited, Grand Cayman (KY)

( * ) Notice: Subject to any disclaimer, the term of this patent is extended or adjusted under 35 U.S.C. 154(b) by 7 days.

(21) Appl. No.: 10/351,927

(22) Filed: Jan. 27, 2003

(51) Int. Cl.⁷ .............................................. H01M 10/46
(52) U.S. Cl. ...................................................... 320/137
(58) Field of Search ................................ 320/103, 107, 320/112, 113, 114, 115, 127, 137; 363/21.07, 21.08, 21.09, 97

(56) References Cited

U.S. PATENT DOCUMENTS

| | | | |
|---|---|---|---|
| 5,166,595 A | 11/1992 | Leverich | 320/32 |
| 5,187,425 A | 2/1993 | Tanikawa | 320/31 |
| 5,204,611 A | 4/1993 | Nor et al. | 320/21 |
| 5,465,039 A | 11/1995 | Narita et al. | 320/32 |
| 5,694,025 A | 12/1997 | Oglesbee et al. | 320/49 |
| 5,698,964 A | 12/1997 | Kates et al. | 320/22 |
| 5,726,554 A | 3/1998 | Freiman et al. | 320/21 |
| 5,847,543 A * | 12/1998 | Carroll | 320/125 |
| 5,898,234 A | 4/1999 | Kitagawa | 307/48 |
| 5,914,585 A * | 6/1999 | Grabon | 320/125 |
| 5,994,875 A | 11/1999 | Lee | 320/132 |
| 6,184,660 B1 | 2/2001 | Hatular | 320/141 |
| 6,246,215 B1 | 6/2001 | Popescu-Stanesti | 320/139 |
| 6,639,812 B2 * | 10/2003 | Nakazawa et al. | 363/21.07 |

* cited by examiner

*Primary Examiner*—Edward H. Tso
(74) *Attorney, Agent, or Firm*—Grossman, Tucker, Perreault & Pfleger, PLLC

(57) ABSTRACT

A charging circuit system includes: a power supply; a sensor configured to sense a power level of the power supply and provide a first signal representative of the power level; and a charging circuit including: at least one input signal terminal and at least one output signal terminal; and a transmitter including an amplifier, wherein the amplifier has an input coupled to at least one input signal terminal, and the amplifier has an output coupled to at least one output signal terminal, wherein at least one input signal terminal is configured to receive the first signal from the sensor, and wherein the amplifier is configured to amplify the first signal and provide a second signal. The charging circuit system may be used by a charging circuit of a laptop computer in conjunction with a docking station.

14 Claims, 3 Drawing Sheets

PORTABLE COMPUTER AND DOCKING STATION HAVING CHARGING CIRCUITS WITH REMOTE POWER SENSING CAPABILITIES

FIELD OF THE INVENTION

This invention relates to portable devices and docking stations having charging circuits with remote power sensing capabilities, and more particularly to charging circuits with an associated transmitter and receiver to provide remote power sensing capabilities.

BACKGROUND OF THE INVENTION

Portable devices such as laptop computers, cell phones, pagers, personal digital assistants, and the like require a self contained power source such as a rechargeable battery, e.g., lithium, nickel-cadmium, or nickel-metal hydride batteries, to facilitate the portable nature of such devices. One exemplary portable device, a laptop computer, is now a common tool for many travelers given there increasingly expanding capabilities and uses.

A docking station couples to a laptop computer in one easy connection to make it more convenient to use a laptop computer in a desktop environment. The docking station may, in turn, be coupled to a variety of peripheral devices such as a full size keyboard, a mouse, disk drives, a full size CRT monitor, a printer, and others. Therefore, a laptop user may make one simple connection, instead of many, to a docking station and have access to a host of peripheral devices not typically available in a laptop computer.

Both conventional laptop computers and docking stations are typically equipped with charging circuits or chargers. A laptop charger provides charging current to charge the laptop's rechargeable battery or batteries. Similarly, the docking station provides charging current to charge the docking station's rechargeable battery or batteries.

Such laptop chargers and docking station chargers typically have two current sensors, e.g., resistors that are located close to the input and output ports of the chargers. Such sensors are located in closed proximity to the chargers because the involved signals are relatively small and easily perturbed. A first current sensor is located close to the input port of the charger and serves to sense the input current from an associated power supply. A second current sensor may be used to control charging current output from the charger. For example, a resistor may be used for both sensors because by monitoring the voltage drop across a known resistor, the current level can be ascertained.

Such chargers may also include a current allocation circuit known to those skilled in the art. Such a circuit receives a sensed signal from a sensor close to its input ports representative of the current provided by the associated power supply. The circuit may then vary charging current provided to the batteries based on the maximum level of supply current available from the power source. For instance, if the maximum level of supply current available from the power source is reached, the current allocation circuit may reduce the charging current for the batteries in order to maintain the current level from the power supply within its maximum tolerance level.

When a laptop is docked on a docking station, the docking station typically provides the power for both the laptop and the docking station. In this instance, if the laptop charger is charging the laptop's battery or batteries, it needs information about the total current delivered by the docking station's power supply in order to keep it within its maximum current supply limits. In order to do this, it is known to send all the power from the docking station to the laptop via an associated conductor and connector in order for the laptop supply sensor to sense such current supply levels.

It is then also necessary to send-back to the docking station sufficient power required by its circuitry via another conductor and connector. As such, the associated conductors and connectors need to have high current carrying capability. Higher current levels also translate into higher power losses as well. In addition, when both current sensors on the input side of the laptop charger and docking station charger are resistors, the current path from the docking station to the laptop and back to the docking station encounters such resistors in series which further increases power losses.

Accordingly, there is a need in the art for a portable device and docking station that have charging circuits with remote power sensing capabilities.

BRIEF SUMMARY OF THE INVENTION

A charging circuit system consistent with the invention includes: a power supply; a sensor configured to sense a power level of the power supply and provide a first signal representative of the power level; and a charging circuit including: at least one input signal terminal and at least one output signal terminal; and a transmitter including an amplifier, wherein the amplifier has an input coupled to at least one input signal terminal, and the amplifier has an output coupled to at least one output signal terminal, wherein at least one input signal terminal is configured to receive the first signal from the sensor, and wherein the amplifier is configured to amplify the first signal and provide a second signal.

Another charging circuit system consistent with the invention includes: a first power supply; a sensor configured to sense a power level of the first power supply and provide a first signal representative of the power level; a transmitter configured to accept the first signal and transmit a second signal representative of the power level; a charging circuit comprising: a receiver configured to receive the second signal; and a current allocation circuit coupled to the receiver, where the current allocation circuit provides a control signal to maximize a charging current to an associated battery while maintaining a supply current from the first power supply within a maximum current rating of the first power supply.

A docking station for a laptop computer consistent with the invention includes: a docking power supply; a docking sensor configured to sense a power level of the docking power supply and provide a first signal representative of the power level; and a docking charging circuit including: at least one input signal terminal and at least one output signal terminal; and a transmitter including an amplifier, the amplifier having an input coupled to at least one input signal terminal, and the amplifier having an output coupled to at least one output signal terminal, wherein at least one input signal terminal is configured to receive said first signal from said docking sensor, and wherein the amplifier is configured to amplify the first signal and provide a second signal.

Another docking station for a laptop computer consistent with the invention includes: a docking power supply; a docking sensor configured to sense a power level of the docking power supply and provide a first signal representative of the power level; and a docking charging circuit including a transmitter configured to accept the first signal and transmit a second signal representative of said first signal.

A laptop computer system consistent with the invention includes: an input device; a processor; an output device; a battery; a remote power supply; a laptop charging circuit configured to provide a charging current to the battery and to receive supply current from the remote power supply, the laptop charging circuit including: a receiver configured to receive a first signal representative of the supply current from the remote power supply; and a current allocation circuit coupled to the receiver, the current allocation circuit configured to provide a control signal configured to maximize the charging current to the battery while maintaining the supply current from the remote power supply within a maximum current rating of the remote power supply.

A battery charging system for a laptop computer consistent with the invention include a docking station and a laptop computer, wherein the docking station includes: a docking power supply; a docking sensor configured to sense a power level of the docking power supply and provide a first docking signal representative of the power level; and a docking charging circuit including a transmitter configured to accept the first docking signal and transmit a second signal representative of the first signal; wherein the laptop computer comprises: a battery; a laptop charging circuit configured to provide a charging current to the battery and to receive supply current from the docking power supply, the laptop charging circuit including: a receiver configured to receive the second signal; and a current allocation circuit coupled to the receiver, the current allocation circuit configured to provide a control signal configured to maximize the charging current to the battery while maintaining the supply current from the docking power supply within a maximum current rating of the docking power supply.

A method of remotely sensing a current level provided by a docking power supply consistent with the invention includes the steps of: docking a laptop computer to a docking station including the docking power supply; sensing the current level provided by the docking power supply; transmitting a signal representative of the current level sensed by the sensing step; and receiving the signal at the laptop computer.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
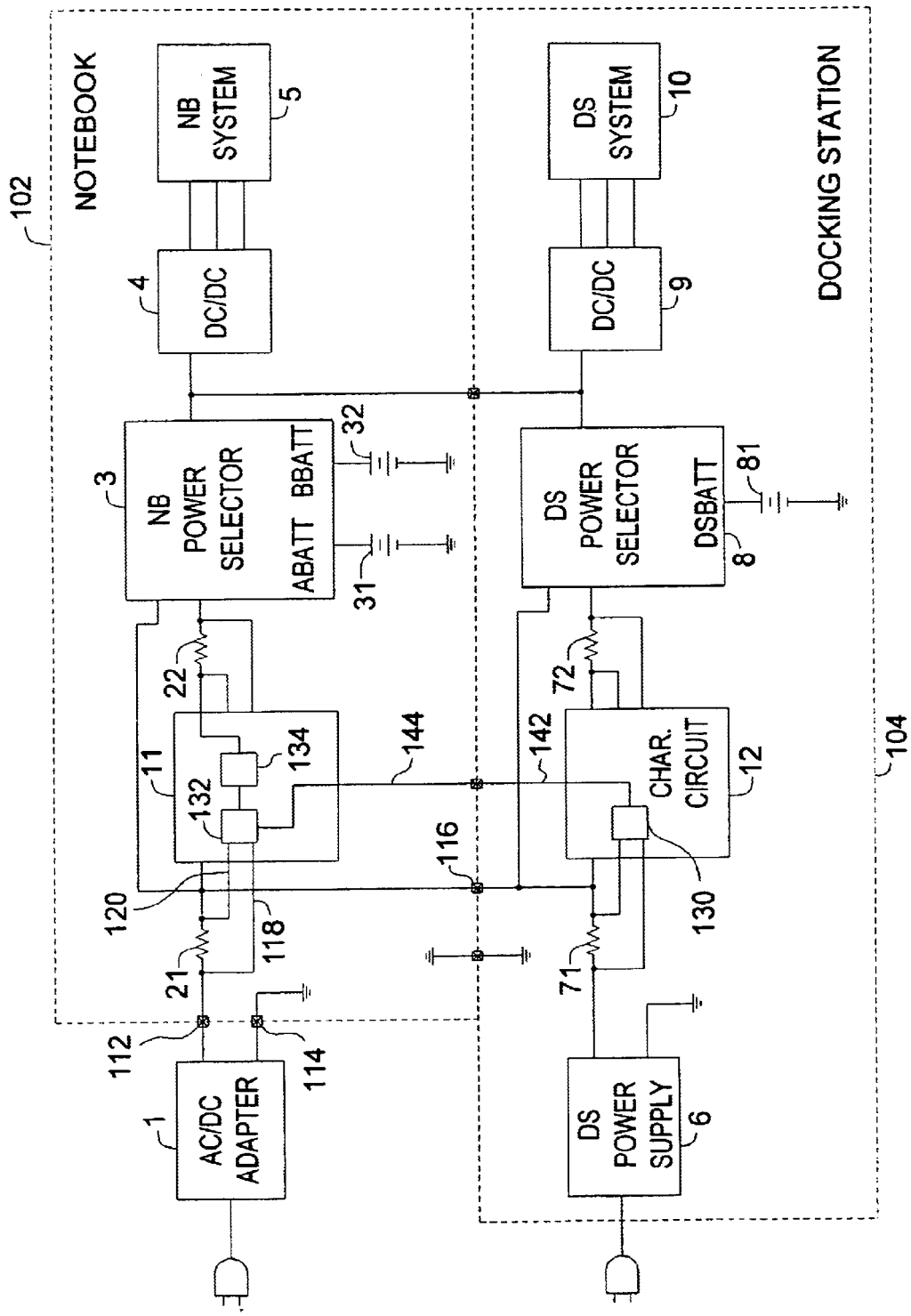
FIG. 1 is a block diagram of a laptop computer and docking station consistent with the present invention.

Turning to FIG. 1, a block diagram of a laptop computer 102 and docking station 104 is illustrated. The laptop computer 102 may generally include a laptop charging circuit 11, a power selector 3, a DC/DC converter 4, and a laptop system 5. Located in proximity to the laptop charging circuit 11 may be a first sensor resistor 21 and a second sensor resistor 22. A rechargeable laptop battery, or as illustrated a pair of rechargeable laptop batteries 31, 32, may be coupled to the laptop power selector 3.

The laptop computer 102 may also include a variety of components known to those skilled in the art which are not illustrated in FIG. 1. Such components may include an input device for inputting data to the laptop, a processing circuit or processor, for example a Pentium processor available from Intel Corporation, for executing instructions and controlling operation of the laptop 102, and an output device, e.g., a LCD or speakers, for outputting data from the laptop.

The laptop 102 may also be equipped with a pair of terminals 112, 114 for accepting an AC/DC adapter 1. The AC/DC adapter 1 is typically utilized to recharge the laptop batteries 31, 32 when the laptop is not coupled to the docking station 104. In such an instance, a first sensor resistor 211 may be used to monitor the input current of the AC/DC adapter 1. For instance, conductors 118, 120 may be coupled to either side of the sensor resistor 21 and to the laptop charging circuit 11 to input the voltage drop across the first sensor resistor 21 to the laptop charging circuit 11. The voltage drop across the first sensor resistor 21 is proportional to the current supplied by the AC/DC adapter 1.

The laptop charging circuit 11 may be further equipped with a current allocation circuit 1134. The current allocation circuit 134 may be responsive to the signal received by a sensor to dynamically adjust the charging current level to the batteries 31, 32 depending on other internal current needs and the maximum rated level of supply current from a power source 1 or 6.

For example, the laptop computer 102 may be coupled to the docking station 104 and the docking station may then provide power to recharge the laptop batteries 31, 32. Advantageously, the laptop computer 102 may be configured to remotely sense the power supplied by the docking station's power supply 6 so that it may adjust the charging current supplied by the laptop charging circuit 11 as necessary based on the total current supplied from the docking station's power supply 6. As such, the charging current level may be reduced as necessary to maintain the total current supplied from the power supply 6 within its maximum rated current supply level.

To accomplish this remote power sensing, each charging circuit 11, 12 may be equipped with a transmitter and receiver. As illustrated, the docking station charging circuit 12 is equipped with a transmitter 130 and the laptop charging circuit 11 is equipped with a receiver 132. In operation, the total current supplied by the docking station's power supply 6 is provided to a first sensor resistor 71 of the docking station. A docking station charging circuit 12 consistent with the invention receives a weakened current signal from the sensor resistor 71, and typically amplifies it for its own self-use, as well as to provide a power indication signal to the laptop's charging circuit 11. The power indication signal may be either a current signal or voltage signal large enough to be insensitive to typical noise levels.

In this way, the laptop charging circuit 11 monitors the power indication signal to remotely monitor the total current provided by the docking station's power supply 6. Such power indication signal may be transmitted by the transmitter 130 over an associated docking conductor 142 and associated laptop conductor 144 for receipt by the receiver 132 of the laptop charger 11. Accordingly, the current allocation circuit 134 of the laptop charging circuit 11 may reduce the charging current it provides to the laptop batteries 31, 32 if the maximum rated current of the docking power supply 6 is reached.

Figure 2A:
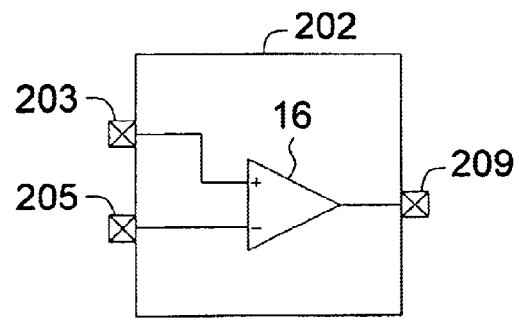
FIG. 2A is a circuit diagram of an exemplary voltage mode transmitter consistent with the invention.

Turning to FIG. 2A, one exemplary transmitter 202 for transmitting a power indication signal is illustrated. The exemplary transmitter 202 is configured to output a voltage signal representative of the total power supplied by the respective power supply. The transmitter 202 may be part of the laptop's charging circuit 11 or the docking station's charging circuit 12. The transmitter 202 may have a first input terminal 203 and a second input terminal 205 to accept a signal representative of the total power supplied by the associated power supply, e.g., power supply 6 if the transmitter is located in the docking station's charging circuit 12.

The first terminal 203 may be coupled to a first side of a first sensor resistor, e.g., first sensor resistor 21 or 71, and a second input terminal 205 may be coupled to a second side of the first sensor resistor 21 or 71. Accordingly, the voltage drop across the first sensor resistor is input to the transmitter 202 via the input terminals 203, 205. An amplifier 16 amplifies the voltage drop across the sensor resistor to an amplified voltage level relative to ground. The output of the amplifier 16 may be coupled to the transmitter output terminal 209. For example, when the transmitter is part of the docking station's charging circuit 12, the voltage drop across sensor resistor 71 is input to the input terminals 203, 205. This voltage drop signal is amplified and available at output terminal 209.

Figure 2B:
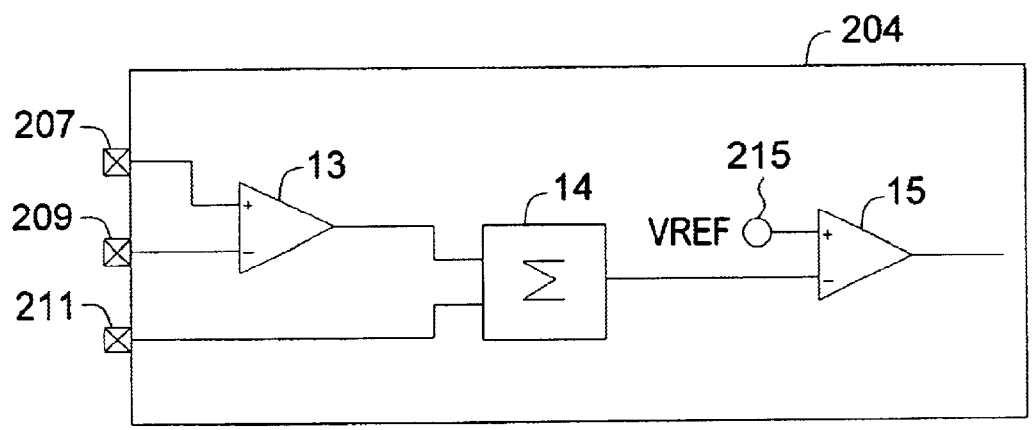
FIG. 2B is a circuit diagram of an exemplary voltage mode receiver for receiving a voltage signal transmitted by the transmitter of FIG. 2A.

Turning to FIG. 2B, an exemplary receiver 204 for receiving a voltage signal transmitted by the transmitter 202 of FIG. 2A is illustrated. Such a voltage signal may be received at the receiver input terminal 211. Additional input signals may be received at additional input terminals 207, 209. Such input terminals 207, 209 may receive a voltage signal indicative of the voltage drop across the first sensor resistor 21 or 71 and input such signal to an amplifier 13. The amplifier 13 amplifies the voltage drop across the sensor resistor to an amplified voltage level relative to ground.

A summing circuit 14 may be configured to accept a first input from the output of the amplifier 13 and a second input from the input terminal 211 and sum the two signals. The summation circuit could also function as a multiplexer (MUX) in that it may send signals from the first input and second input on the same output channel to the error amplifier 15. The receiver 204 may also include an error amplifier 15, which may be configured to accept the output of the summing circuit 14 and a reference voltage source 215 to provide an error signal. Such an error signal may then be utilized, for example, by the current allocation circuit 134 to control a PWM signal by adjusting its duty cycle based on the error signal.

For example, when the transmitter 202 is part of the docking station's charging circuit 12, the voltage drop across sensor resistor 71 is input to the input terminals 203, 205. This voltage drop signal is amplified and available at output terminal 209 of the transmitter 202. Such a signal may be transmitted to an associated receiver 204 located in an associated charging circuit 111 of a lap top via a power sensing signal lines 142, 144 of the docking station and laptop respectively.

If there is no AC/DC adapter 1 in use, the voltage drop across the first sensor resistor 21 of the laptop would be zero. Accordingly, the output of the summing circuit 14 would be equal to the voltage signal received on the input terminal 211 of the receiver 204. This voltage signal along with a reference voltage provided by a reference voltage source 215 would be input to the amplifier 15 and the output error signal may be used to adjust the duty cycle of a PWM signal.

Figure 3A:
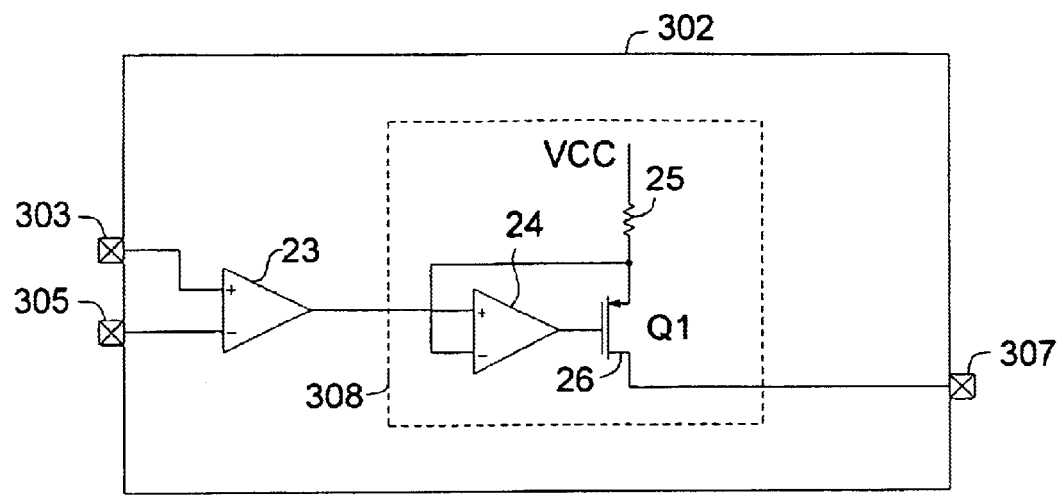
FIG. 3A is a circuit diagram of an exemplary current mode transmitter consistent with the invention.

Turning to FIG. 3A, another exemplary transmitter 302 for providing a power sensing signal is illustrated. Such a transmitter 302 may be located in a docking station charging circuit 12 or laptop charging circuit 11. The transmitter 302 is configured to provide a current signal, as opposed to a voltage signal as previously detailed with reference transmitter 202. To provide a current signal, the transmitter 302 includes a voltage to current conversion circuit 308.

The input to the conversion circuit 308 may be a voltage signal ascertained similarly to the voltage signal of FIG. 2A. That is, a first input signal terminal 303 and a second input signal terminal 305 may be coupled across a first sensor resistor 21 or 71 to provide a signal representative of the voltage drop across that resistor. An amplifier 23 amplifies such voltage signal and provides it to the conversion circuit 308.

The conversion circuit 308 may be a variety of configurations known to those skilled in the art for converting a voltage signal to a proportional current signal. In the illustrated embodiment, the conversion circuit 308 includes an amplifier 24, a MOSFET transistor 26, and a conversion resistor 25. The amplifier 24 may have its non-inverting input coupled to the output of the first amplifier 23, and it inverting input coupled to the source of the MOSFET transistor 26. The MOSFET transistor 26 may further be of the PMOS type. The output of the amplifier 24 may be coupled to the gate of the transistor 26, while the drain of the transistor 26 may be coupled to the current output terminal 307. The MOSFET transistor may also be of the NMOS type having its source coupled directly to the current output terminal 307. A conversion resistor 25 may be further coupled between a supply voltage Vcc and the source of the transistor 26. Accordingly, an output current signal is provided to the output terminal 307 which is proportionate to the voltage drop across the first sense resistor 21 or 71.

Figure 3B:
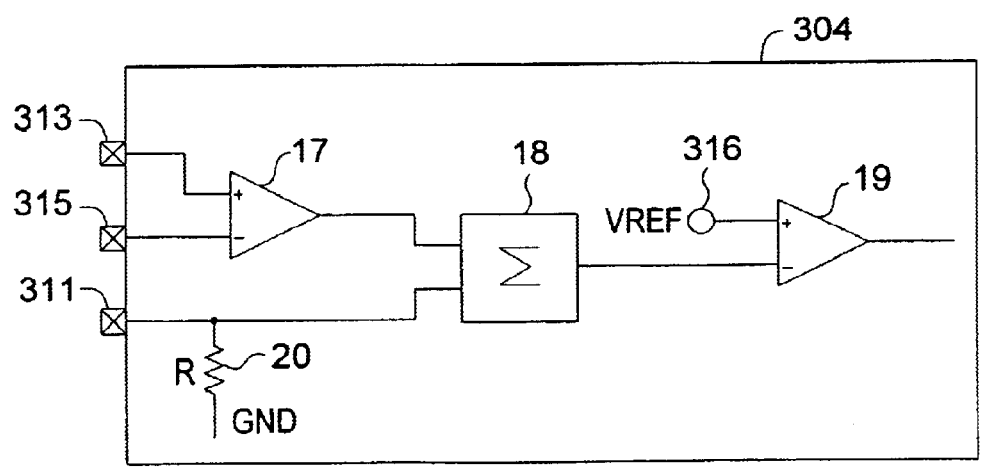
FIG. 3B is a circuit diagram of an exemplary current mode receiver consistent with the invention for receiving a current signal transmitted by the transmitter of FIG. 3A.

Turning to FIG. 3B, an exemplary receiver 304 for receiving a current signal transmitted by the transmitter 302 of FIG. 3A is illustrated. Such a current signal may be received at the receiver input terminal 311. Additional input signals may be received at additional input terminals 313, 315. Such input terminals 313, 315 may receive a voltage signal indicative of the voltage drop across the first sensor resistor 21 or 71 and input such signal to an amplifier 17. The amplifier 17 amplifies the voltage drop across the sensor resistor to an amplified voltage level relative to ground. The amplified output signal from the amplifier 17 may then be input to a summing circuit 18.

The other input to the summing circuit 18 is the voltage across the conversion resistor 20, which is proportionate to the current received by the receiver 304 at the input terminal 311. The summing circuit 18 sums the input signal from the first amplifier 17 and signal proportionate to the voltage drop across the conversion resistor 20 and outputs the sum of such input signals to an error amplifier 19. The summation circuit 18 could also function as a MUX in that it may send signals from the first input and second input on the same output channel to the error amplifier 19. The error amplifier 19 may be configured to accept the output of the summing circuit 18 and a reference voltage provided by a reference voltage source 316. An output signal from such amplifier 19 may then be utilized, for example, by the current allocation circuit 134 to control a PWM signal by adjusting its duty cycle based on the output of the amplifier 19.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A charging circuit system comprising:
a power supply;
a sensor configured to sense a power level of said power supply and provide a first signal representative of said power level; and
a charging circuit comprising:
at least one input signal terminal and at least one output signal terminal; and
a transmitter comprising an amplifier, said amplifier having an input coupled to said at least one input signal terminal, and said amplifier having an output coupled to said at least one output signal terminal, wherein said at least one input signal terminal is configured to receive said first signal from said sensor, and wherein said amplifier is configured to amplify said first signal and provide a second signal, wherein said sensor comprises a current sensor, and wherein said second signal is a voltage signal, and said transmitter further comprises a conversion circuit configured to convert said second signal to a third signal proportionate to said second signal, wherein said third signal is a current signal.

2. The system of claim 1, wherein said conversion circuit comprises a conversion circuit amplifier configured to receive said second signal from said amplifier and provide an output to a transistor, wherein a first electrode of said transistor is coupled to said at least one output signal terminal.

3. The charger of claim 1, wherein said transistor is a PMOS transistor and said first electrode is a drain electrode.

4. The charger of claim 2, wherein said transistor in an NMOS transistor and said first electrode is a source electrode.

5. A charging circuit system comprising:
a first power supply;
a sensor configured to sense a power level of said first power supply and provide a first signal representative of said power level;
a transmitter configured to accept said first signal and transmit a second signal representative of said power level;
a charging circuit comprising:
a receiver configured to receive said second signal;
a current allocation circuit coupled to said receiver, said current allocation circuit configured to provide a control signal to maximize a charging current to an associated battery while maintaining a supply current from said first power supply within a maximum current rating of said first power supply; and
an error amplifier configured to provide said control signal based on said second signal;
a second power supply; and
said receiver further comprising a summation circuit and an input amplifier, wherein said summation circuit comprises a first summation input terminal and second summation input terminal, wherein said first summation input terminal is coupled to a first input signal terminal for receiving said second signal, and said second summation input terminal is coupled to an output of said input amplifier, wherein said input amplifier is configured to receive an input signal representative of a power level of said second power supply, and wherein an output of said summation circuit is coupled to said error amplifier.

6. A charging circuit system comprising:
a first power supply;
a sensor configured to sense a power level of said first power supply and provide a first signal representative of said power level;
a transmitter configured to accept said first signal and transmit a second signal representative of said power level, wherein said second signal is a voltage signal;
a charging circuit comprising:
a receiver configured to receive said second signal;
a current allocation circuit coupled to said receiver, said current allocation circuit configured to provide a control signal to maximize a charging current to an associated battery while maintaining a supply current from said first power supply within a maximum current rating of said first power supply;
a second power supply; and
said receiver further comprising an error amplifier, a summation circuit, and an input amplifier, wherein said summation circuit comprises a first summation input terminal and second summation input terminal, wherein said first summation input terminal is coupled to a first input signal terminal of said charging circuit for receiving said second signal, and said second summation input terminal is coupled to an output of said input amplifier, wherein said input amplifier is configured to receive an input signal representative of a power level of said second power supply, and wherein an output of said summation circuit is coupled to said error amplifier, said error amplifier configured to provide an output control signal based on said output of said summation circuit.

7. A charging circuit system comprising:
a first power supply;
a sensor configured to sense a power level of said first power supply and provide a first signal representative of said power level;
a transmitter configured to accept said first signal and transmit a second signal representative of said power level, wherein said second signal is a current signal;
a charging circuit comprising:
a receiver configured to receive said second signal;
a current allocation circuit coupled to said receiver, said current allocation circuit configured to provide a control signal to maximize a charging current to an associated battery while maintaining a supply current from said first power supply within a maximum current rating of said first power supply;
a second power supply; and
said receiver further comprising an error amplifier, a summation circuit, and an input amplifier, wherein said summation circuit comprises a first summation input terminal and second summation input terminal, wherein said first summation input terminal is coupled to a first input signal terminal of said charging circuit for receiving said second signal and a conversion resistor for providing a voltage drop across said conversion resistor in proportion to said second signal, and said second summation input terminal is coupled to an output of said input amplifier, wherein said input amplifier is configured to receive an input signal representative of a power level of said second power supply, and wherein an output of said summation circuit is coupled to said error amplifier, said error amplifier configured to provide an output control signal based on said output of said summation circuit.

8. A docking station for a laptop computer comprising:

a docking power supply;

a docking sensor configured to sense a power level of said docking power supply and provide a first signal representative of said power level; and a docking charging circuit comprising:
- at least one input signal terminal and at least one output signal terminal; and
- a transmitter comprising an amplifier, said amplifier having an input coupled to said at least one input signal terminal, and said amplifier having an output coupled to said at least one output signal terminal, wherein said at least one input signal terminal is configured to receive said first signal from said docking sensor, and wherein said amplifier is configured to amplify said first signal and provide a second signal; wherein said second signal is a voltage signal, and said transmitter further comprises a convention circuit configured to convert said second signal to a third signal proportionate to said second signal, wherein said third signal is a current signal.

9. The docking station of claim 8, wherein said conversion circuit comprises a conversion circuit amplifier configured to receive said second signal from said amplifier and provide an output to a transistor, wherein a first electrode of said transistor is coupled to said at least one output signal terminal.

10. The docking station of claim 8, wherein said transistor is a PMOS transistor and said first electrode is a drain electrode.

11. The docking station of claim 8, wherein said transistor is an NMOS transistor and said first electrode is a source electrode.

12. A laptop computer system comprising:

an input device;

a processor;

an output device;

a battery;

a remote power supply;

a laptop charging circuit configured to provide a charging current to said battery and to receive supply current from said remote power supply, said laptop charging circuit comprising:
- a receiver configured to receive a first signal representative of said supply current from said remote power supply;
- a current allocation circuit coupled to said receiver, said current allocation circuit configured to provide a control signal configured to maximize said charging current to said battery while maintaining said supply current from said remote power supply within a maximum current rating of said remote power supply; and
- an error amplifier configured to provide said control signal based on said first signal;

a laptop power supply; and said receiver further comprising a summation circuit and an input amplifier, wherein said summation circuit comprises a first summation input terminal and second summation input terminal, wherein said first summation input terminal is coupled to a first input signal terminal for receiving said first signal and said second summation input terminal is coupled to an output of said input amplifier, wherein said input amplifier is configured to receive an input signal representative of a power level of said laptop power supply, and wherein an output of said summation circuit is coupled to said error amplifier.

13. A laptop computer system comprising:

an input device;

a processor;

an output device;

a battery;

a remote power supply;

a laptop charging circuit configured to provide a charging current to said battery and to receive supply current from said remote power supply; said laptop charging circuit comprising:
- a receiver configured to receive a first signal representative of said supply current from said remote power supply, wherein said first signal is a voltage signal; and
- a current allocation circuit coupled to said receiver, said current allocation circuit configured to provide a control signal configured to maximize said charging current to said battery while maintaining said supply current from said remote power supply within a maximum current rating of said remote power supply;

a laptop power supply; and said receiver further comprising an error amplifier, a summation circuit, and an input amplifier, wherein said summation circuit comprises a first summation input terminal and second summation input terminal, wherein said first summation input terminal is coupled to a first input signal terminal of said charging circuit for receiving said first signal, and said second summation input terminal is coupled to an output of said input amplifier, wherein said input amplifier is configured to receive an input signal representative of a power level of said laptop power supply, and wherein an output of said summation circuit is coupled to said error amplifier, said error amplifier configured to provide said control signal based on said output of said summation circuit.

14. A laptop computer system comprising:

an input device;

a processor;

an output device a battery;

a remote power supply;

a laptop charging circuit configured to provide a charging current to said battery and to receive supply current from said remote power supply, said laptop charging circuit comprising:
- a receiver configured to receive a first signal representative of said supply current from said remote power supply, wherein said first signal is a current signal; and
- a current allocation circuit coupled to said receiver, said current allocation circuit configured to provide a control signal configured to maximize said charging current to said battery while maintaining said supply current from said remote power supply within a maximum current rating of said remote power supply;

a laptop power supply; and said receiver further comprising an error amplifier, a summation circuit, and an input amplifier, wherein said summation circuit comprises a first summation input terminal and second summation input terminal, wherein said first summation input terminal is coupled to a first input terminal of said charging circuit for receiving said first signal and a conversion resistor for providing a voltage drop across said conversion resistor in proportion to said first signal, and said second summation input terminal is coupled to an output of said input amplifier, wherein said input amplifier is configured to receive an input signal representative of a power level of said laptop power supply, and wherein an output of said summation circuit is coupled to said error amplifier, said error amplifier configured to provide said control signal based on said output of said summation circuit.

* * * * *